May 20, 1941. R. J. SHOEMAKER ET AL 2,242,440
BEARING
Filed Aug. 15, 1938  2 Sheets-Sheet 1
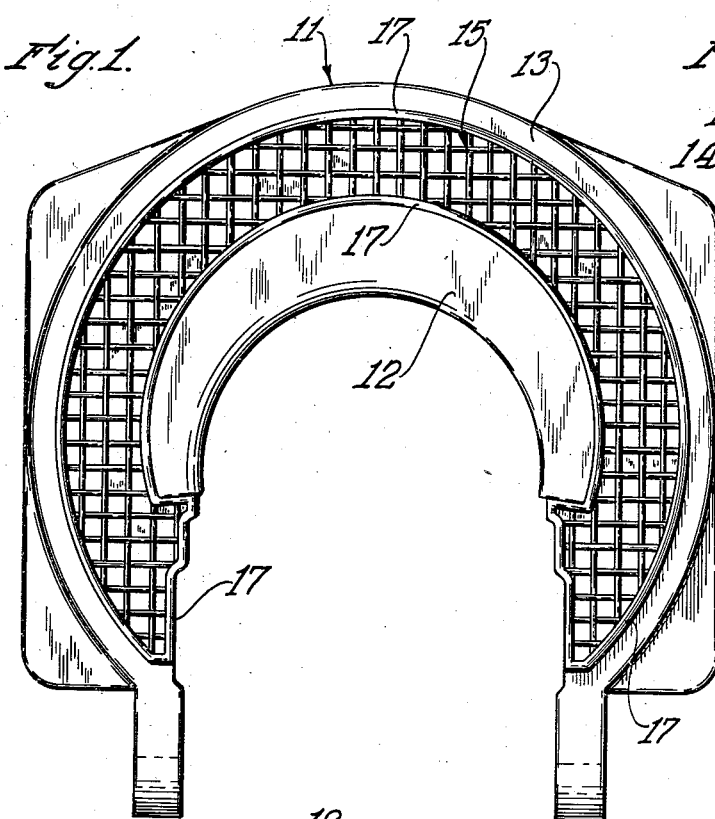
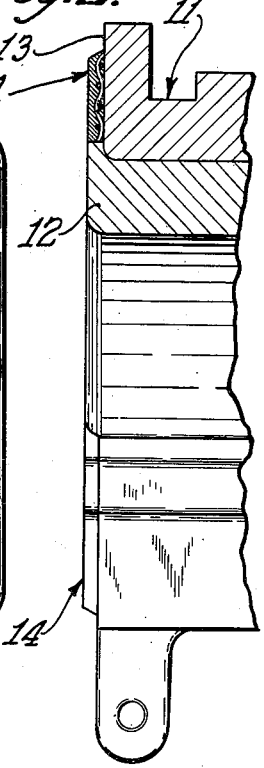
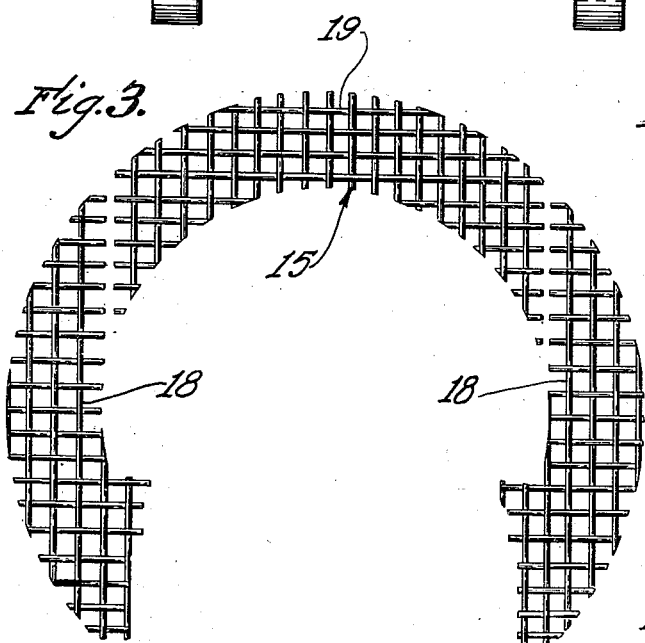
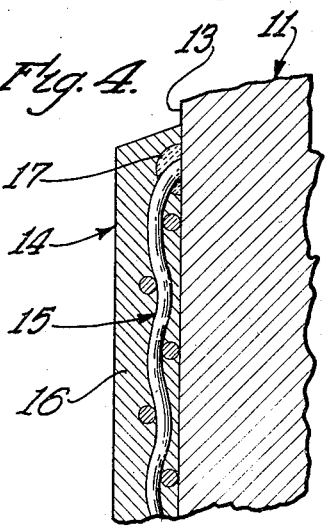
INVENTOR.
Robert J. Shoemaker
Charles M. House
BY Charles B. Rasmussen
ATTORNEY.

May 20, 1941.  R. J. SHOEMAKER ET AL  2,242,440
BEARING
Filed Aug. 15, 1938  2 Sheets-Sheet 2
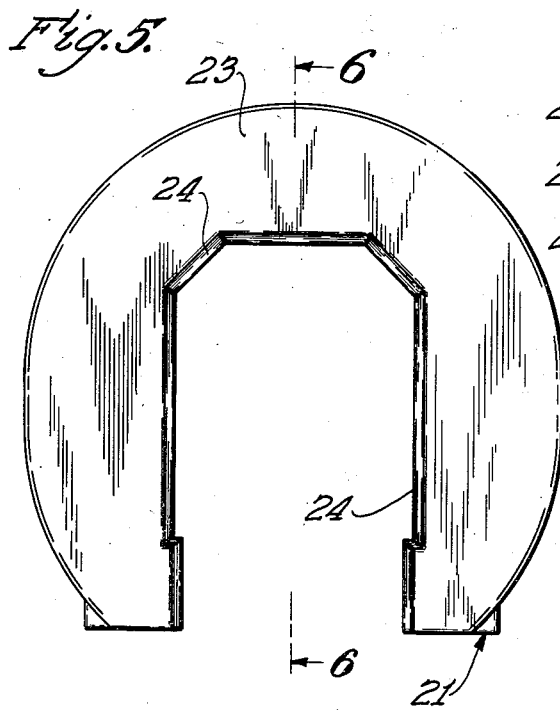
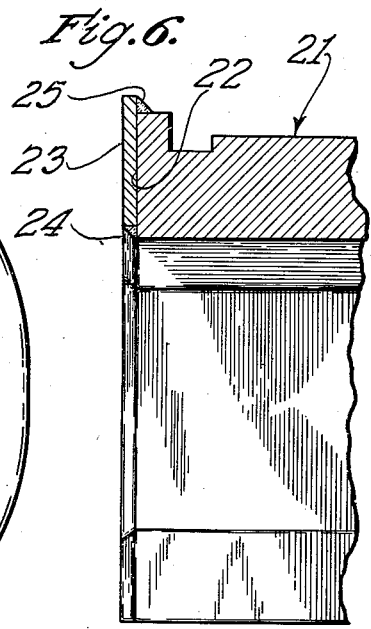
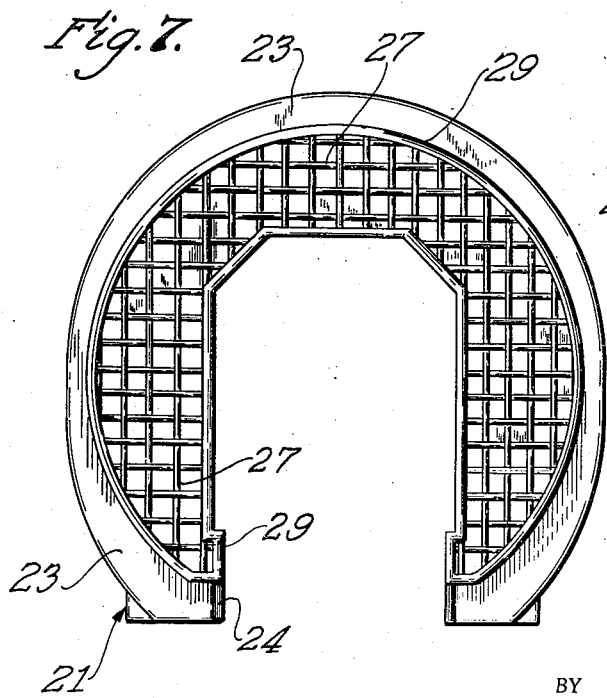
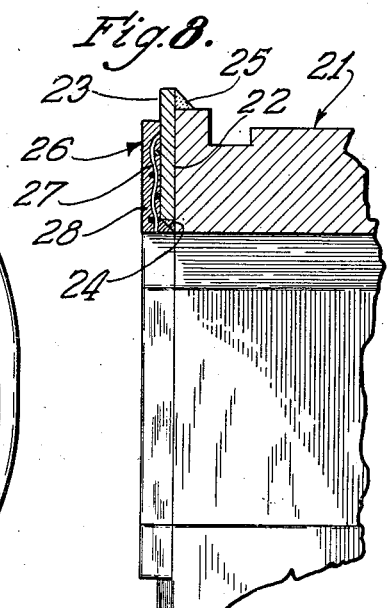
INVENTORS.
Robert J. Shoemaker
Charles M. House
BY Charles B. Rasmussen
ATTORNEY.

Patented May 20, 1941

2,242,440

UNITED STATES PATENT OFFICE 2,242,440

BEARING

Robert J. Shoemaker and Charles M. House, Chicago, Ill., assignors, by mesne assignments, to National Lead Company, a corporation of New Jersey Application August 15, 1938, Serial No. 224,997

3 Claims. (Cl. 308—237)

This invention relates in general to bearings, and more particularly to improvements in engine truck and driving boxes.

A principal object of the invention is the provision of improved means for materially increasing the anti-friction properties and the resistance to wear of bearing surfaces; the preferred embodiment thereof being applied to the lateral wearing surfaces or hub liners or faces of engine truck or driving boxes.

Another important object of the invention is the provision of a compound bearing which permits the use of relatively soft bearing metal, with its attendant advantages, where the load has heretofore been considered to be too great, by combining with it in a novel manner bronze, or other suitable relatively hard bearing metal, which is highly resistant to flowing under maximum load.

A further important object of the invention is the provision of a bearing surface having increased life and strength, which is obtained by using relatively hard wire netting of suitable construction and composition as a reinforcement for a relatively soft bearing metal, preferably one which consists of the following substances in proportions approximately as follows: 0.5% to 2.0% tin, 0.3% to 1.0% calcium, 0.1% to 0.5% mercury, 0.02% to 0.1% aluminum, 0.05% to 0.1% magnesium, and/or 0.02% to 0.06% potassium, and/or 0.02% to 0.06% lithium, together with lead to make up 100%.

Numerous other objects and advantages of the invention will be apparent as it is better understood from the following description, which, when taken in connection with the accompanying drawings, discloses a preferred embodiment thereof.

In the drawings:

Figure 1 is an end elevation of an engine driving box showing the relatively hard wire netting, forming a part of the instant invention, applied to a lateral wearing face thereof;

Fig. 2 is a vertical sectional view of part of the box of Fig. 1 after the relatively soft bearing metal has been applied thereto;

Fig. 3 is a plan view of the wire netting employed, showing a preferred method of cutting the same to avoid waste;

Fig. 4 is an enlarged detail vertical section of a portion of the box and hub face liner bearing of Fig. 2;

Fig. 5 is an end elevation of an engine truck box having a face plate mounted thereon to facilitate application of a bearing embodying the features of the instant invention thereto;

Fig. 6 is a sectional view taken substantially on the line 6—6 of Fig. 5;

Fig. 7 is an elevation of the box of Fig. 5 with the wire netting forming a part of this invention applied thereto; and Fig. 8 is a sectional view similar to Fig. 6 of the engine truck box of Fig. 7 after the relatively soft bearing metal has been applied thereto.

Referring more particularly to the drawings, reference numeral 11 indicates in general an engine driving box of any suitable construction, having the usual bearing portion 12 mounted therein and hub face 13 bordering the outer end of the latter. In this type of engine driving box the end surface of the bearing portion 12 normally constitutes the end or lateral wearing surface against which the hub of the associated journal or wheel bears. Heretofore, this portion has constituted one of the weakest points of the box, and many expedients, such as hard metal inserts and the like, have been employed in an attempt to increase the effective life of the engine driving box. The instant invention contemplates the addition of a hub face liner or bearing member to the box which will materially increase the anti-friction properties and the resistance to wear of the lateral bearing surface thereof.

In the present embodiment of the invention, the hub face or lateral surface 13 of the engine driving box 11 has a supplemental bearing or hub face liner, indicated generally by reference numeral 14, applied thereto which comprises a wire netting of relatively hard metal, such as bronze, indicated generally by reference numeral 15, and a relatively soft bearing metal 16 within which the wire netting 15 is imbedded.

Referring more particularly to Fig. 1, the wire netting 15, which is in the shape of a crescent having an inner diameter approximately the same as the outer diameter of the end portion of the bearing 12 of the box 11 and an outer diameter substantially less than that of the hub face 13, is welded at 17 along its marginal edge portions to the hub face 13 of the box. It will be understood that before the wire netting 15 can be thus applied, the face of the box must be free from grease and dirt. It is preferred that the arc welding process, using bronze welding wire, be employed in thus securing the netting 15 to the face 13 of the box 11.

After the wire netting 15 has been thus secured to the face 13 of the box, as shown in Fig. 1, the relatively soft bearing metal 16 is cast thereon, as shown in Figs. 2 and 4, in the following manner. Where necessary, the face 13 of the box and the wire netting 15 are first sandblasted until clean. The face 13 and netting 15 are then pickled for approximately ten minutes, or until bright and clean, preferably in a solution of approximately 50% of commercial muriatic acid and 50% water. This pickling step has been found to be essential in order to obtain the necessary bond between the bearing metal 16 and the face 13 and netting 15. The pickled portions of the box should be flushed off with clear water immediately after pickling, and the moisture resulting therefrom may be blown off with an air hose.

These pickled surfaces are then fluxed in the usual manner and immersed in a solder pot, preferably containing 70-30 solder, for approximately ten minutes. The flux should not be allowed to dry before immersing in the solder, and the temperature of the solder should be maintained between 650° F. and 700° F. during this operation. Since the life of the bearing 14 depends to a great extent on the soundness of the tinning, every care should be exercised to insure a thoroughly tinned surface. It is not necessary to sweep or brush off the tinned surface, if a good clean job of preparing such surface is done. The bearing metal 16 must be poured as quickly as possible after tinning, and the pouring operation should consume as little time as possible.

It has been found that the most satisfactory results are obtained when a bearing metal is employed which consists of the following substances in proportions by weight approximately as follows:

Tin, 0.5% to 2.0%, preferably 1.0%;
Calcium, 0.3% to 1.0%, preferably 0.5%;
Mercury, 0.1% to 0.5%; preferably 0.25%;
Aluminum, 0.02% to 0.1%, preferably 0.05%;
Magnesium, 0.05% to 0.1%, preferably 0.075%; and/or
Potassium, 0.02% to 0.06%, preferably 0.04%; and/or
Lithium, 0.02% to 0.06%, preferably 0.04%;
Lead, to make up 100%

In the pouring of this bearing metal, the hub face 13 of the box 11 should be positioned in a substantially horizontal plane, with a suitable mold approximately 1 inch deep disposed thereon for retaining the molten metal. The pouring should be done in such a manner as to avoid washing the solder from the tinned surface, that is, the bearing metal 16 should be poured rapidly and at a point or points where it will have to run the least distance to cover the entire surface to which it is applied. At the time of pouring this bearing metal 16, it should be between 950° F. and 1100° F., preferably nearer 1100° than 950°. In the type of engine driving box illustrated in Figs. 1, 2 and 4, the bearing metal 16 should be poured from ⅞ of an inch to 1 inch in thickness and so as to completely enclose the wire netting 15.

Since it is possible to rupture the soldered bond by rough handling before the latter has cooled sufficiently, great care should be taken in handling the box 11 after the above casting operation. This is due to the fact that the bearing metal 16 solidifies at a higher temperature than the solder employed. When cold, the bearing metal 16 should be tested by ringing out with a hammer to determine whether or not a tight bond has been obtained. The bearing metal 16 is then machined to proper lateral thickness, preferably to a point where it is flush with the outer end surface of the bearing portion 12 of the box 11. The machined surface should be smooth and free from tool marks.

In Fig. 3, a preferred method of cutting the wire netting 15 is illustrated which will minimize waste thereof. As shown, two similar pieces of wire netting 18 for the opposite lower portions of the lateral surface 13 of the box 11 and a single piece 19 which is adapted to substantially cover the upper intermediate portion of the surface 13 are provided. These separate pieces 18 and 19 are preferably welded together at their adjoining ends to provide a unitary piece of netting, prior to the application thereof to the surface 13 in the manner above described.

From the above, it will be seen that the auxiliary bearing 14 is so secured to the lateral face 13 of the box 11 that there will be no possibility of it flowing or being wiped off, even though cracks may subsequently develop in the bearing metal 16. The bearing 14 presents a smooth lateral surface of relatively soft metal to its associated hub, so that heating will not develop in the initial use or operation thereof. After a period of continued use, the outer portion of the relatively soft bearing metal 16 may be worn away to expose the relatively hard wire netting 15. This will automatically increase the resistance to wear of the bearing 14 due to the hardness of the metal employed for the netting 15. It will also be appreciated that when the wire netting 15 is exposed, the relatively soft bearing metal 16 will function as a metal lubricant therefor.

It is intended to be within the scope of the instant invention to employ any other suitable metal members in place of the wire netting 15 herein disclosed, and these members may take any desired form and shape, provided they are capable of functioning in the manner above attributed to the wire netting 15. It will also be appreciated that the bearing 14 is merely a preferred embodiment of the invention, and that a bearing of similar construction may be applied to any desired backing member in lieu of the engine driving box 11. Such a bearing may be employed on either curved or flat surfaces of any desired configuration, and it may be used as a supplement bearing, as above described, as a new bearing, or in repairing or replacing a worn bearing surface.

As a further illustration of another use of the bearing of the instant invention, it is shown in Figs. 5 to 8 as being applied to a lateral wearing surface of an engine truck box. In this embodiment of the invention, reference numeral 21 indicates in general an engine truck box of usual construction having a lateral wearing surface 22. A steel plate 23 of proper thickness to give the correct lateral dimension to the box 21 may be mounted upon the wearing surface 22 of the box and welded thereto at 24 and 25 along the entire inner and outer marginal portions thereof. Plate 23 is preferably so shaped as to extend above both the inner and outer marginal portions of the end surface 22 of the box 21. With this arrangement, the welds 24 and 25 may be given a bevelled outer surface, as illustrated in Fig. 6. The face 22 of the box 21, if it is a box that has previously been serviced, may be first machined so that a true lateral surface will result.

A bearing, indicated generally by reference numeral 26, similar to the bearing 14 above described, and comprising relatively hard wire netting 27 and relatively soft bearing metal 28 is then applied to the outer surface of the plate 23. The wire netting 27, of similar properties and characteristics to the wire netting 15, and having a shape similar to that of the plate 23 (Fig. 7), is welded at 29 along its marginal edge portions to the plate in the same manner as the wire netting 15 is welded at 17. The same process is then employed in applying the soft bearing metal 28 to the end surface of the plate 23 and the wire netting 27 as is described above relative to the application of the bearing metal 16 to the box 11. If the box 11 is new, rather than one which has been in service, the plate 23 may well be omitted.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. A composite bearing, comprising a backing portion, bronze wire netting secured at its marginal edges to said backing portion, and relatively soft bearing metal secured to said backing portion by said netting, said netting and said bearing metal being adapted to present a composite hard and soft bearing surface.

2. A bearing, comprising a backing portion, bronze wire netting secured at its marginal edges to said backing portion, and a relatively soft metal lining portion having said netting embedded therein, said lining portion and said netting being so constructed and arranged that a smooth, soft metal bearing surface is initially presented which subsequently will be worn down to a composite hard and soft bearing surface.

3. A bearing, comprising a backing member, bronze wire netting secured at its marginal edges to said backing member, and a soft metal lining portion secured to said backing member by said netting being embedded therein, said lining portion presenting a relatively thin layer of soft metal exteriorly of said netting, whereby a smooth, soft metal bearing surface is initially presented to facilitate running in of the bearing which subsequently will be worn down to a composite hard and soft bearing surface with the soft metal portion thereof functioning to pick up any foreign abrasive material and allow the same to be embedded therein.

ROBERT J. SHOEMAKER.
CHARLES M. HOUSE.